(12) United States Patent
Saini et al.

(10) Patent No.: US 12,572,572 B2
(45) Date of Patent: Mar. 10, 2026

(54) INFORMATION RETRIEVAL USING AN AUGMENTED QUERY PRODUCED BY GRAPH CONVOLUTION

(71) Applicant: Microsoft Technology Licensing, LLC, Redmond, WA (US)

(72) Inventors: Deepak Saini, Bellevue, WA (US); Jian Jiao, Bellevue, WA (US); Aditya Lakshman Kalari, Seattle, WA (US); Chaoyin Li, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 18/234,519

(22) Filed: Aug. 16, 2023

(65) Prior Publication Data

US 2025/0061136 A1 Feb. 20, 2025

(51) Int. Cl.
| | |
|---|---|
| *G06F 16/332* | (2025.01) |
| *G06F 16/31* | (2019.01) |
| *G06F 40/284* | (2020.01) |
| *G06F 40/30* | (2020.01) |

(52) U.S. Cl.
CPC .......... *G06F 16/332* (2019.01); *G06F 16/316* (2019.01); *G06F 40/284* (2020.01); *G06F 40/30* (2020.01)

(58) Field of Classification Search
CPC .................................................... G06F 16/332
See application file for complete search history.

(56) References Cited

U.S. PATENT DOCUMENTS

| | | | | |
|---|---|---|---|---|
| 2020/0311146 A1* | 10/2020 | Guo | ........................ | G06N 3/044 |
| 2021/0182686 A1* | 6/2021 | Wang | ........................ | G06N 3/09 |
| 2022/0108175 A1* | 4/2022 | Lyske | ........................ | G06N 3/02 |
| 2022/0230628 A1* | 7/2022 | Zhu | .................... | G06F 16/90332 |
| 2024/0126795 A1* | 4/2024 | Zhong | .................... | H04L 51/02 |

OTHER PUBLICATIONS

"What are keyword match types, and how do I use them?," available at https://help.ads.microsoft.com/apex/index/3/en-us/50822, Microsoft Corporation, Redmond, WA, accessed on Jul. 14, 2023, 5 pages.
Veličković, et al., "Graph Attention Networks," arXiv, arXiv:1710. 10903v3 [stat.ML], Feb. 4, 2018, 12 pages.
(Continued)

*Primary Examiner* — Van H Oberly

(57) ABSTRACT

An information retrieval technique uses one or more machine-trained models to generate one or more metadata embeddings. The technique then combines a query embedding with the metadata embedding(s). In some cases, the technique performs this operation using a graph convolution operation. This yields an augmented embedding. The technique then uses the augmented embedding to retrieve at least one item. The augmented embedding lies in the same vector space as target-item embeddings associated with candidate target items. Otherwise, the vector spaces associated with the query embedding and metadata embedding(s) can be different. In some implementations, the technique use dense retrieval, which enables the technique to deliver output results in real time.

19 Claims, 12 Drawing Sheets

(56) References Cited

OTHER PUBLICATIONS

Vaswani, et al., "Attention Is All You Need," in 31st Conference on Neural Information Processing Systems (NIPS 2017), 2017, 11 pages.
Devlin, et al., "BERT: Pre-training of Deep Bidirectional Transformers for Language Understanding," arXiv, arXiv:1810.04805v2 [cs.CL], May 24, 2019, 16 pages.
Radford, et al., "Improving Language Understanding by Generative Pre-Training," OpenAI, San Francisco, California, Jun. 11, 2018, 12 pages.
"Introducing The World's Largest Open Multilingual Language Model: BLOOM," available at https://bigscience.huggingface.co/blog/bloom, accessed on Feb. 13, 2023, 2 pages.
Scao, et al., "BLOOM: A 176B-Parameter Open-Access Multilingual Language Model," arXiv, arXiv:2211.05100v2 [cs.CL], Dec. 11, 2022, 62 pages.
Hu, et al., "Learning Discrete Representations via Constrained Clustering for Effective and Efficient Dense Retrieval," in WSDM 2022: Proceedings of the 15th ACM Web Science Conference, Feb. 11, 2022, pp. 1328-1336.
Liu, et al., "GNN-encoder: Learning a Dual-encoder Architecture via Graph Neural Networks for Passage Retrieval," arXiv, arXiv:2204.08241v1 [cs.IR], Apr. 18, 2022, 11 pages.
Wang, et al., "Query2doc: Query Expansion with Large Language Models," in Proceedings of the 2023 Conference on Empirical Methods in Natural Language Processing, Dec. 2023, pp. 9414-9423.
Wang, et al., "Query2doc: Query Expansion with Large Language Models," arXiv, arXiv:2303.07678v1 [cs.IR], Mar. 14, 2023, 9 pages.
PCT Search Report and Written Opinion for PCT Application No. PCT/US2024/037275, Mailing date of Oct. 30, 2024, 18 pages.

* cited by examiner

RETRIEVAL
COMPONENT, FIRST
IMPLEMENTATION

502 ⟍

$E_{Q+}$

INDEX-
SEARCHING
COMPONENT
506

MATCHING
TARGET ITEM(S)

504

INDEX

RETRIEVAL
COMPONENT, SECOND
IMPLEMENTATION

602 ⟍

$E_{Q+}$

GENERATIVE
MODEL
COMPONENT
604

MATCHING
TARGET ITEM(S)

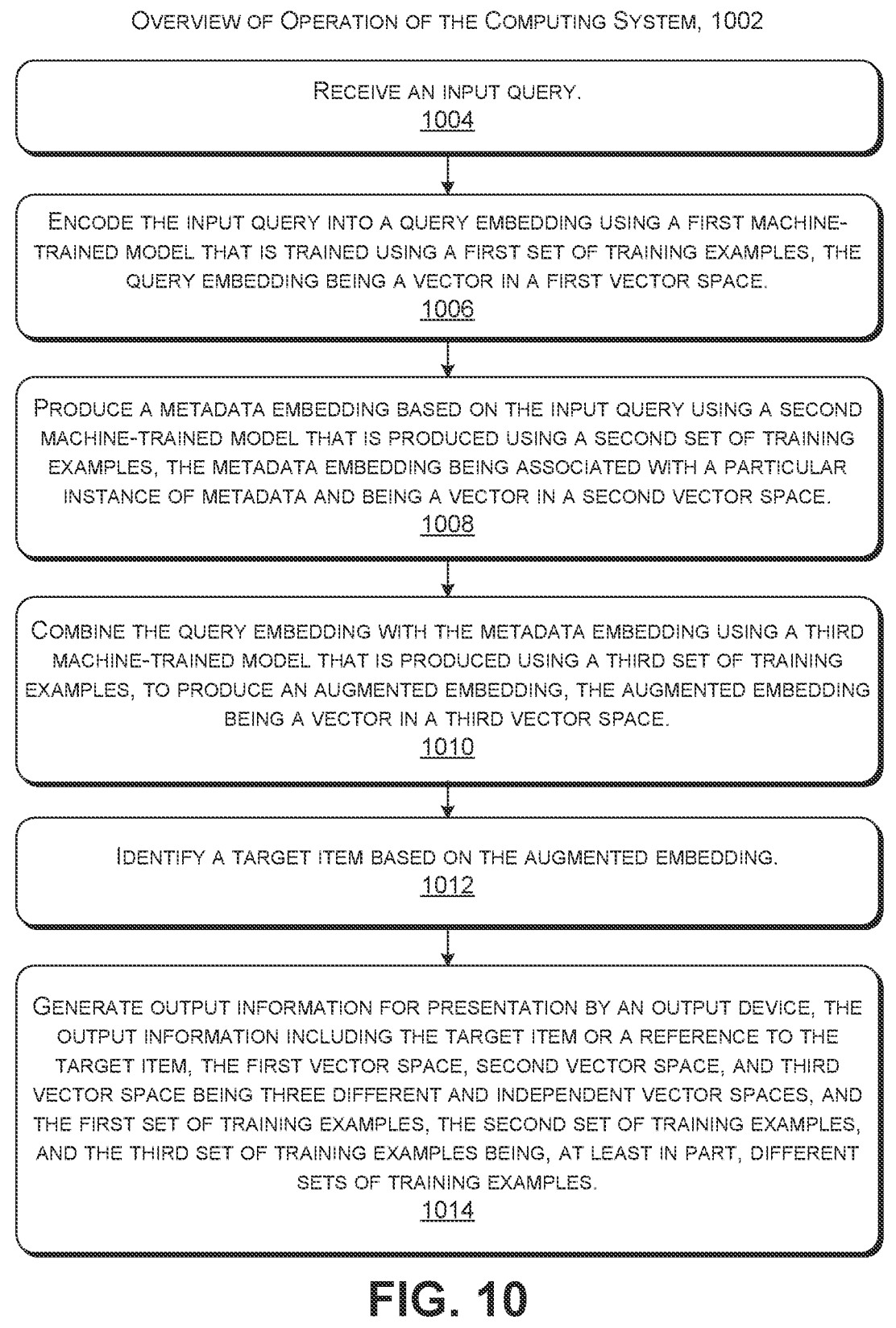

OVERVIEW OF OPERATION OF THE COMPUTING SYSTEM, 1002

RECEIVE AN INPUT QUERY.
1004

ENCODE THE INPUT QUERY INTO A QUERY EMBEDDING USING A FIRST MACHINE-TRAINED MODEL THAT IS TRAINED USING A FIRST SET OF TRAINING EXAMPLES, THE QUERY EMBEDDING BEING A VECTOR IN A FIRST VECTOR SPACE.
1006

PRODUCE A METADATA EMBEDDING BASED ON THE INPUT QUERY USING A SECOND MACHINE-TRAINED MODEL THAT IS PRODUCED USING A SECOND SET OF TRAINING EXAMPLES, THE METADATA EMBEDDING BEING ASSOCIATED WITH A PARTICULAR INSTANCE OF METADATA AND BEING A VECTOR IN A SECOND VECTOR SPACE.
1008

COMBINE THE QUERY EMBEDDING WITH THE METADATA EMBEDDING USING A THIRD MACHINE-TRAINED MODEL THAT IS PRODUCED USING A THIRD SET OF TRAINING EXAMPLES, TO PRODUCE AN AUGMENTED EMBEDDING, THE AUGMENTED EMBEDDING BEING A VECTOR IN A THIRD VECTOR SPACE.
1010

IDENTIFY A TARGET ITEM BASED ON THE AUGMENTED EMBEDDING.
1012

GENERATE OUTPUT INFORMATION FOR PRESENTATION BY AN OUTPUT DEVICE, THE OUTPUT INFORMATION INCLUDING THE TARGET ITEM OR A REFERENCE TO THE TARGET ITEM, THE FIRST VECTOR SPACE, SECOND VECTOR SPACE, AND THIRD VECTOR SPACE BEING THREE DIFFERENT AND INDEPENDENT VECTOR SPACES, AND THE FIRST SET OF TRAINING EXAMPLES, THE SECOND SET OF TRAINING EXAMPLES, AND THE THIRD SET OF TRAINING EXAMPLES BEING, AT LEAST IN PART, DIFFERENT SETS OF TRAINING EXAMPLES.
1014

FIG. 10

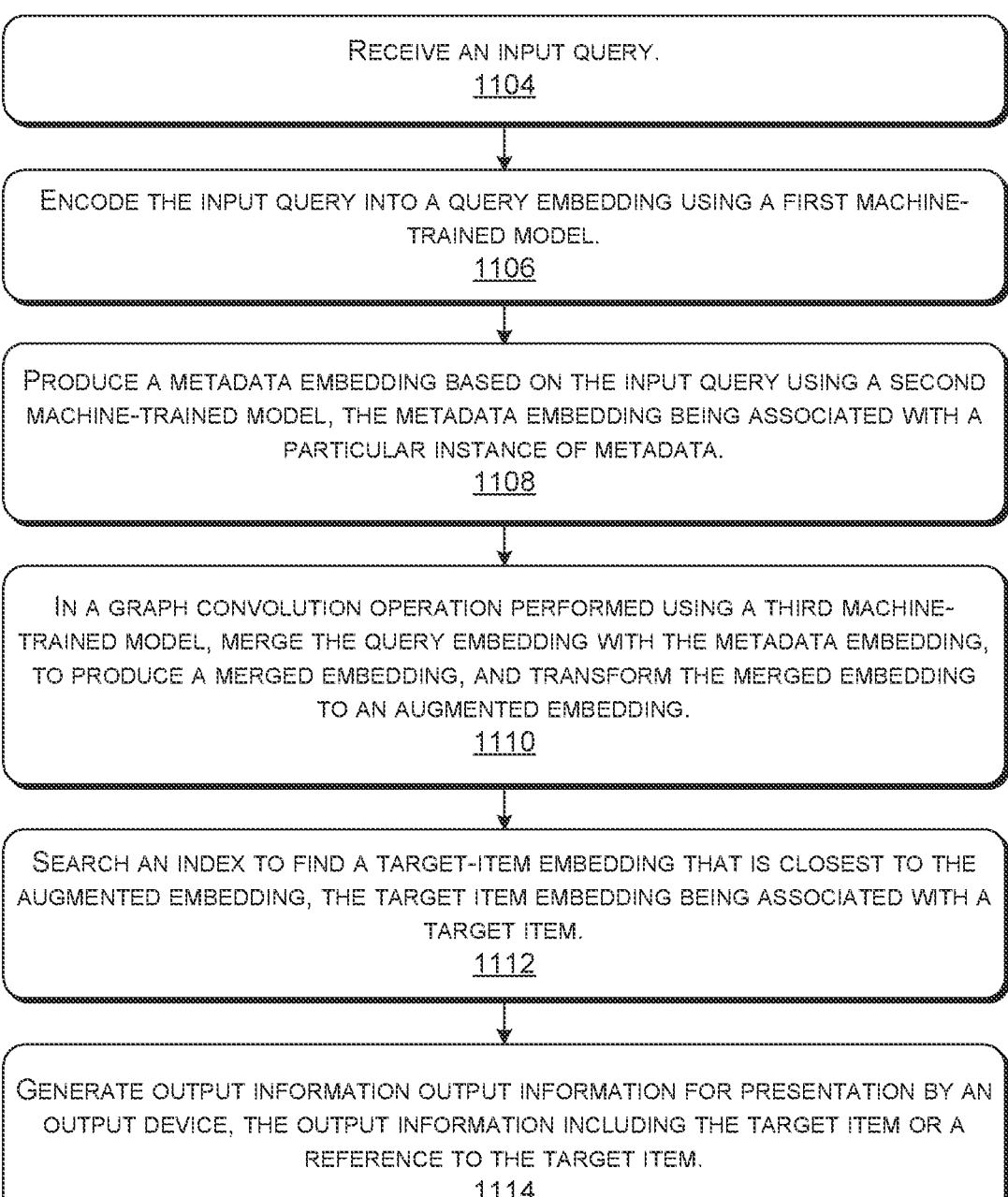

OVERVIEW OF OPERATION OF THE COMPUTING SYSTEM, 1102

RECEIVE AN INPUT QUERY.
1104

ENCODE THE INPUT QUERY INTO A QUERY EMBEDDING USING A FIRST MACHINE-TRAINED MODEL.
1106

PRODUCE A METADATA EMBEDDING BASED ON THE INPUT QUERY USING A SECOND MACHINE-TRAINED MODEL, THE METADATA EMBEDDING BEING ASSOCIATED WITH A PARTICULAR INSTANCE OF METADATA.
1108

IN A GRAPH CONVOLUTION OPERATION PERFORMED USING A THIRD MACHINE-TRAINED MODEL, MERGE THE QUERY EMBEDDING WITH THE METADATA EMBEDDING, TO PRODUCE A MERGED EMBEDDING, AND TRANSFORM THE MERGED EMBEDDING TO AN AUGMENTED EMBEDDING.
1110

SEARCH AN INDEX TO FIND A TARGET-ITEM EMBEDDING THAT IS CLOSEST TO THE AUGMENTED EMBEDDING, THE TARGET ITEM EMBEDDING BEING ASSOCIATED WITH A TARGET ITEM.
1112

GENERATE OUTPUT INFORMATION OUTPUT INFORMATION FOR PRESENTATION BY AN OUTPUT DEVICE, THE OUTPUT INFORMATION INCLUDING THE TARGET ITEM OR A REFERENCE TO THE TARGET ITEM.
1114

FIG. 11

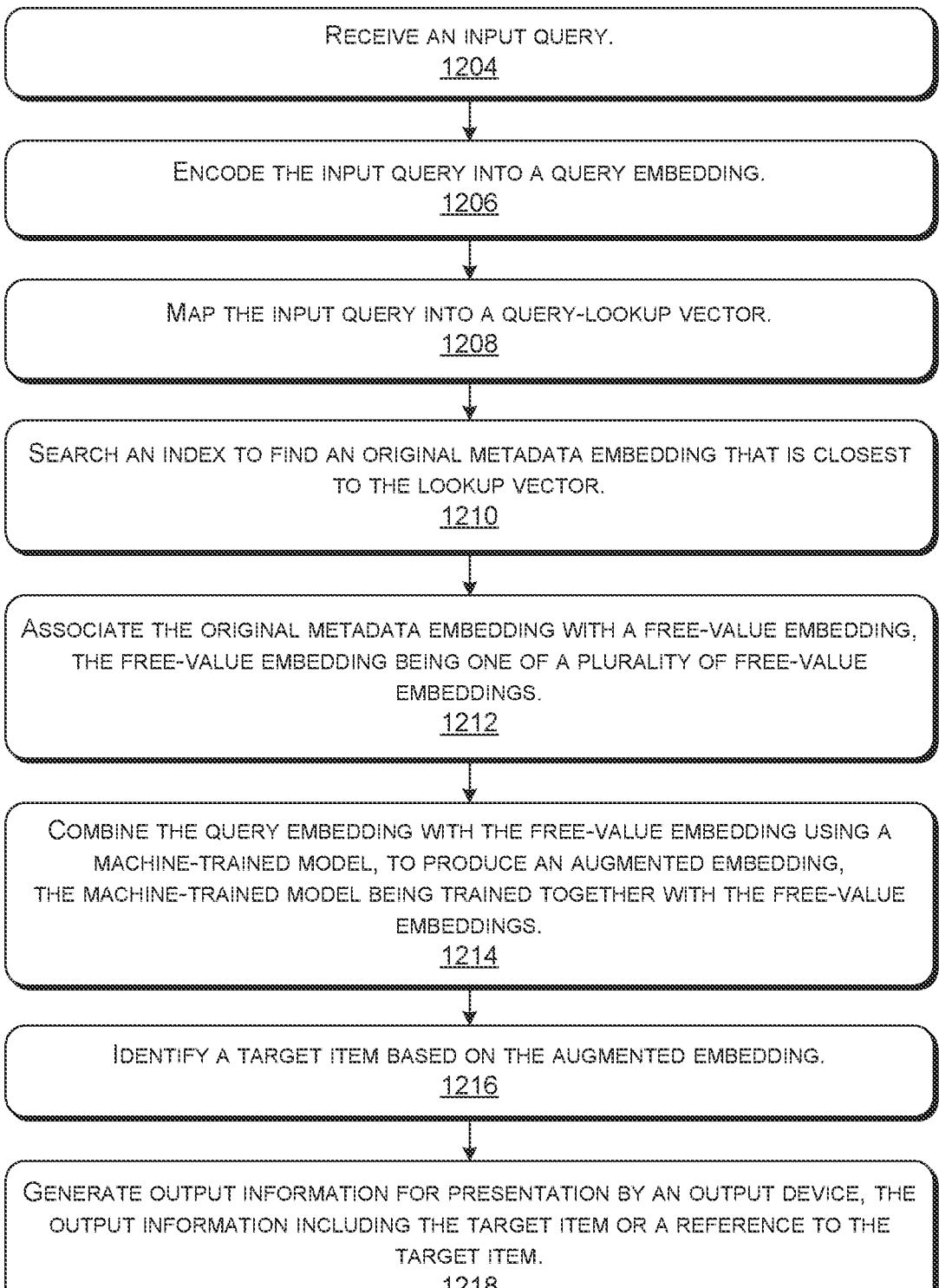

OVERVIEW OF OPERATION OF THE COMPUTING SYSTEM, 1202

RECEIVE AN INPUT QUERY.
1204

ENCODE THE INPUT QUERY INTO A QUERY EMBEDDING.
1206

MAP THE INPUT QUERY INTO A QUERY-LOOKUP VECTOR.
1208

SEARCH AN INDEX TO FIND AN ORIGINAL METADATA EMBEDDING THAT IS CLOSEST
TO THE LOOKUP VECTOR.
1210

ASSOCIATE THE ORIGINAL METADATA EMBEDDING WITH A FREE-VALUE EMBEDDING,
THE FREE-VALUE EMBEDDING BEING ONE OF A PLURALITY OF FREE-VALUE
EMBEDDINGS.
1212

COMBINE THE QUERY EMBEDDING WITH THE FREE-VALUE EMBEDDING USING A
MACHINE-TRAINED MODEL, TO PRODUCE AN AUGMENTED EMBEDDING,
THE MACHINE-TRAINED MODEL BEING TRAINED TOGETHER WITH THE FREE-VALUE
EMBEDDINGS.
1214

IDENTIFY A TARGET ITEM BASED ON THE AUGMENTED EMBEDDING.
1216

GENERATE OUTPUT INFORMATION FOR PRESENTATION BY AN OUTPUT DEVICE, THE
OUTPUT INFORMATION INCLUDING THE TARGET ITEM OR A REFERENCE TO THE
TARGET ITEM.
1218

INFORMATION RETRIEVAL USING AN AUGMENTED QUERY PRODUCED BY GRAPH CONVOLUTION

BACKGROUND

Dense retrieval is a commonly-used information retrieval (IR) technique that involves converting a query into a query embedding, finding a target-item embedding in an index that is closest to the query embedding in a vector space, and retrieving a target item that is associated with the target-item embedding. An embedding is a dense vector in which information is distributed over its dimensions. But dense retrieval can produce search results of poor quality when a short input query is submitted. This is because a short query has just a few tokens that may not adequately reveal the intent underlying the query.

SUMMARY

A technique is described herein for retrieving target items. The technique uses one or more machine-trained metadata models ("metadata models") to generate one or more metadata embeddings. The technique combines a query embedding with the metadata embedding(s). This yields an augmented embedding. The technique uses the augmented embedding to retrieve at least one target item.

According to one illustrative aspect, the technique performs the combining operation using a graph convolution operation.

According to another illustrative aspect, a machine-trained model (the "augmentation model") used in the combining operation is trained to ensure that the augmented embedding lies in the same vector space as target-item embeddings associated with candidate target items. Otherwise, the vector spaces associated with the query embedding and the metadata embedding(s) can be different.

According to another illustrative aspect, a training process involves training a metadata model, and then using this metadata model to produce an index of original metadata embeddings. These original metadata embeddings are associated with a parallel set of free vectors (also referred to as free-value embeddings). The training process then involves jointly training the augmentation model with the set of free-value embeddings. In the interference stage, the technique maps the input query to an original metadata embedding, finds the free-value embedding associated with this original metadata embedding, and then uses the free-value embedding in place of the original embedding in the combining operation. This provision reduces the risk that the intent of the identified target items will diverge from the intent of the original input query.

The technique produces high-quality results in real time. The technique is particularly useful in improving the quality of output results when short queries are submitted. This is because the technique provides a way of efficiently integrating context information into an input query, which, in turn, enables the retrieval operation to more effectively identify target items that match the input query's underlying intent. The technique operates in real time because, in some implementations, it uses efficient and low-latency dense retrieval functionality. The technique is also adaptable and scalable because it provides a framework for efficiently incorporating metadata embeddings provided by independently-developed machine-trained models. For instance, the technique allows a developer to add a new metadata model without retraining existing metadata models.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 10-12 show processes, expressed as flowcharts, which explain the operation of the computing system of FIG. 1 in three respective ways.

The same numbers are used throughout the disclosure and figures to reference like components and features.

DETAILED DESCRIPTION

Section A. Illustrative Computing System

Figure 1:
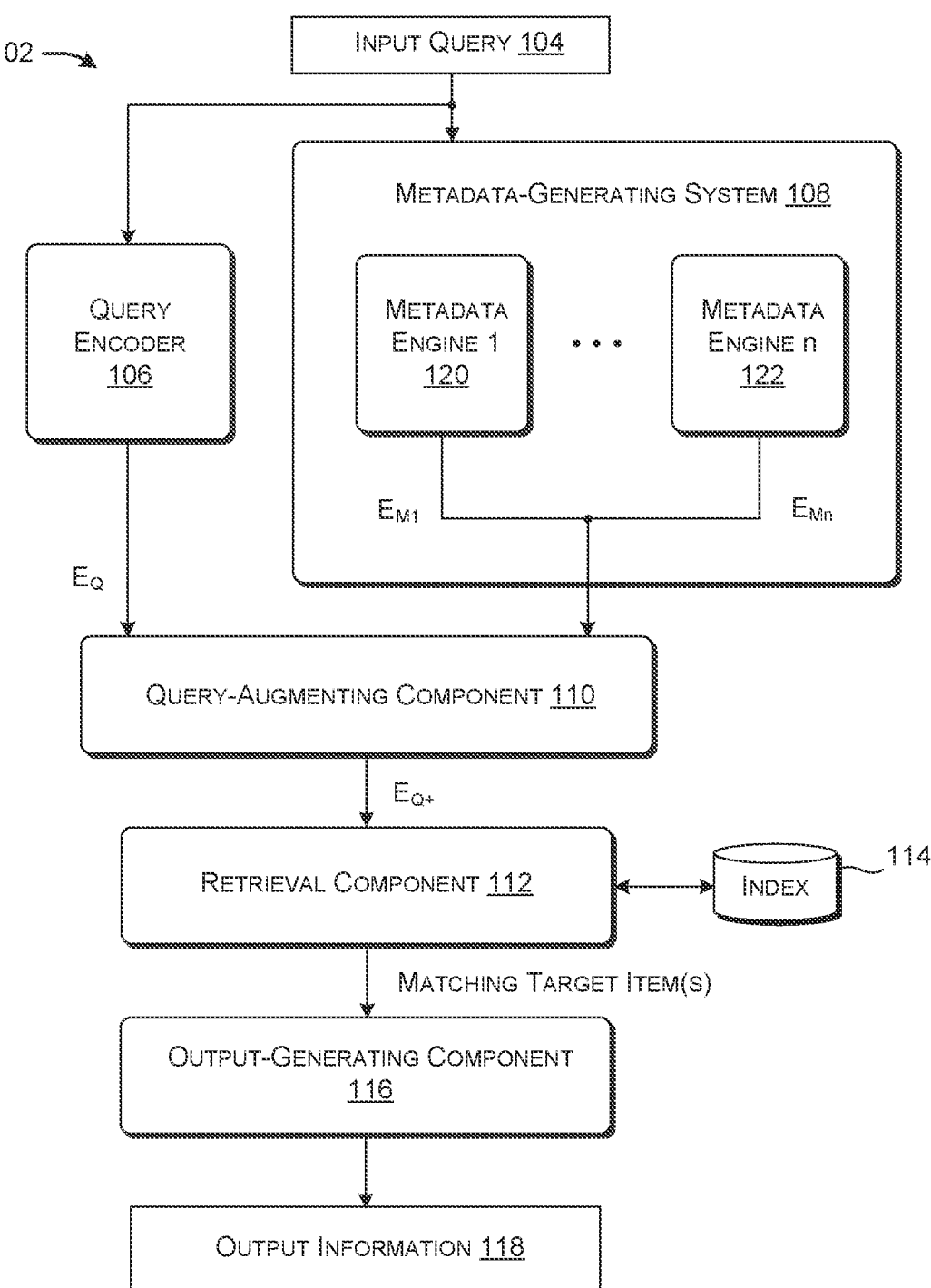
FIG. 1 shows a computing system for retrieving target items based on submitted queries, as supplemented by metadata that is related to the queries and/or the users who submitted the queries.

FIG. 1 shows a computing system 102 for identifying one or more target items based on an input query 104. In one application, the computing system 102 is part of a search engine. In this case, the identified target items correspond to text-based documents, web pages, audio items, videos, etc. In another application, the computing system is part of an ad-serving engine. Here, the identified target items are ads that are selected in response to the input query 104. Still other applications can make use of the computing system 102.

Figure 13:
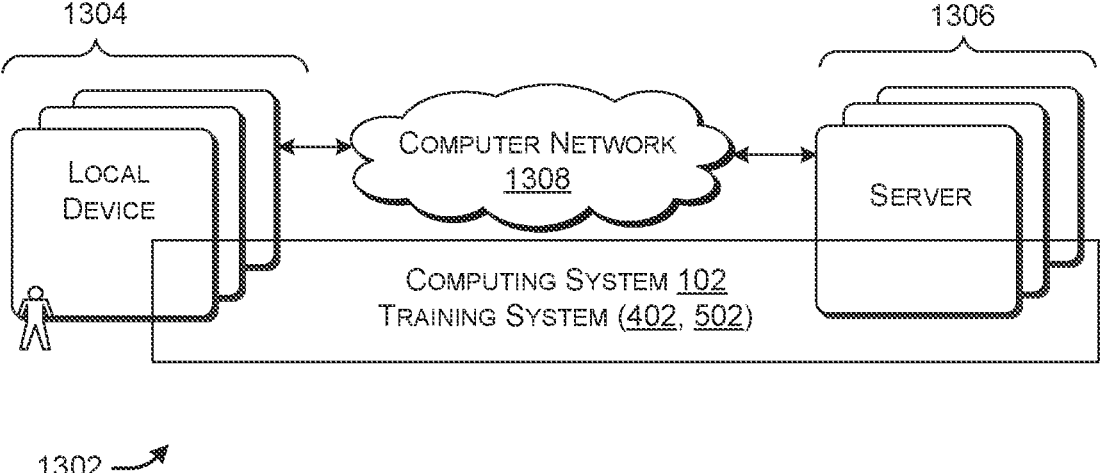
FIG. 13 shows computing equipment that, in some implementations, is used to implement the computing system of FIG. 1 and the training systems of FIG. 8 or 9.
Figure 14:
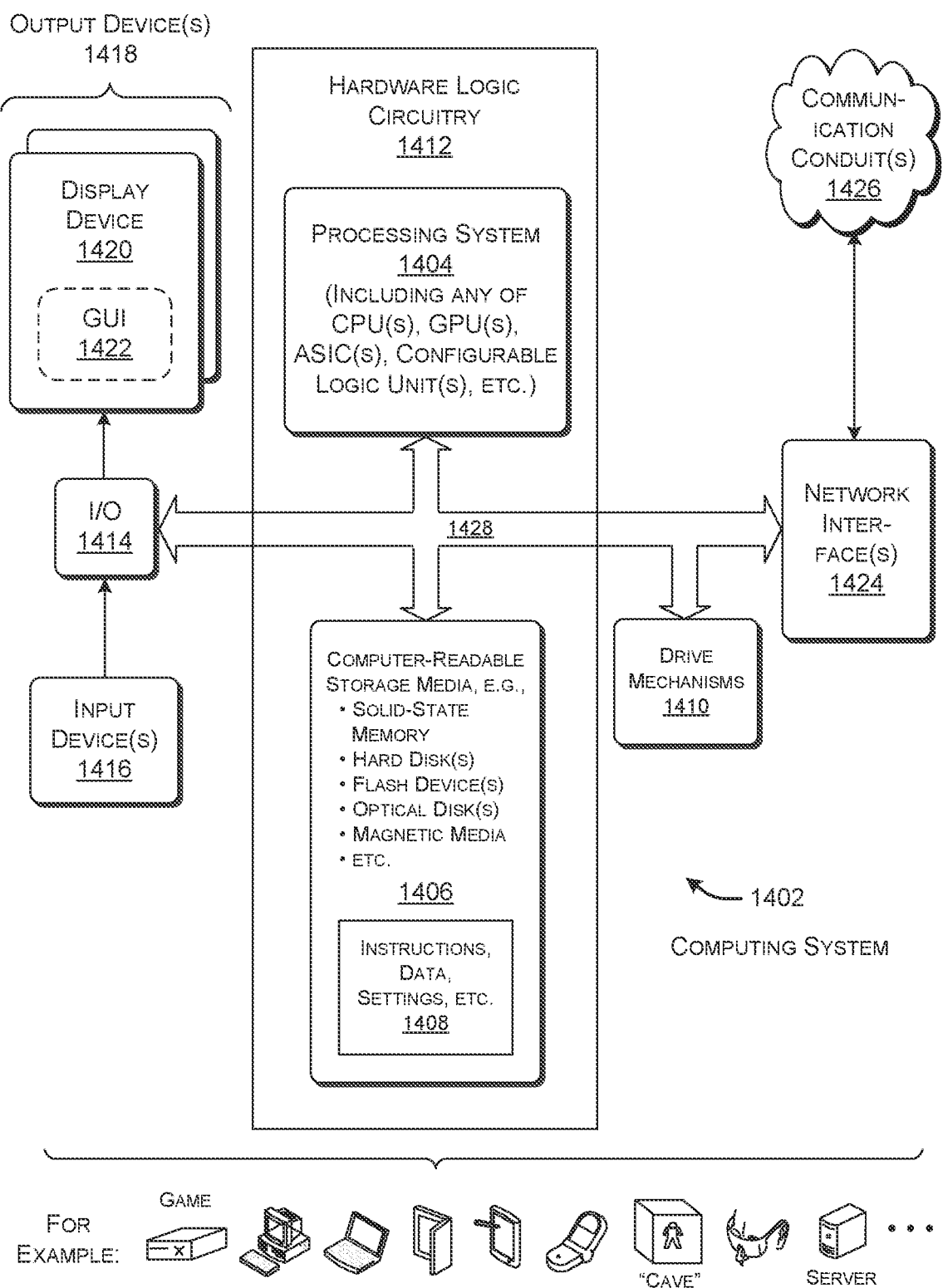
FIG. 14 shows an illustrative type of computing system that, in some implementations, is used to implement any aspect of the features shown in the foregoing drawings.

By way of terminology, in some examples, terms such as "component," "module," "engine," and "tool" refer to parts of computer-based technology that perform respective functions. FIGS. 13 and 14, described below, provide examples of illustrative computing equipment for performing these functions. In some examples, a machine-trained model (or "model" for brevity) refers to computer-implemented logic for executing a task using machine-trained weights that are produced in a training operation. In some examples, a "weight" refers to any type of parameter value that is iteratively produced by the training operation. In some examples, a "token" is a unit of information processed by a model, such as a word or a part of a word. In some examples, an "embedding" refers to a vector in a vector space that distributes its information over its k dimensions. A distributed vector expresses the semantics of a data item in a dense manner, and is in contrast to a sparse one-hot vector that allocates particular dimensions of the vector to particular concepts.

In some implementations, the computing system 102 uses machine-trained models that process text-based tokens, to identify text-based target items. In other implementations, the computing system 102 includes multi-modal machine-trained models that are capable of processing different types of tokens, such as any of text-based tokens, image-based tokens, video-based tokens, and/or audio-based tokens. However, to facilitate explanation, the description to follow principally focuses on examples in which the machine-trained models process text-based tokens.

In some examples, the computing system 102 identifies target items using a three-stage process. In a first stage, a query encoder 106 transforms the input query 104 into a query embedding $E_Q$. Further, a metadata-generating system 108 identifies one or more metadata embeddings ($E_{M1}$, $E_{M2}$, ..., $E_{Mn}$) based on the input query 104. The computing system 102 generates these the embeddings ($E_Q$, $E_{M1}$, $E_{M2}$, ..., $E_{Mn}$) in parallel. In a second stage, a query-augmenting component 110 combines the query embed ding with the metadata embedding(s), to produce an augmented embedding $E_{Q+}$. In some implementations, the query-augmenting component 110 performs its task using a graph convolution operation. In a third stage, a retrieval component 112 uses the augmented embedding to identify one or more target items. In some implementations, the retrieval component 112 performs this task by using the augmented embedding to search an index in a data store 114. An output-generating component 116 provides output information 118 that includes each identified target item or provides a reference to each target item. For instance, the output-generating component 116 produces output information 118 which contains a link to a document that matches the input query 104, e.g., in the context of a search results page produced by a search engine. In another case, the output-generating component 116 produces output information 118 which contains an ad that matches the input query 104.

In some implementations, the computing system 102 uses plural models that produce embeddings in different and independent vector spaces. A vector space defines the universe of embeddings that can be produced by a model. For example, the query encoder 106 uses a query-encoder model for converting queries into query embeddings in a first vector space. The metadata-generating system 108 includes one more metadata engines (120, ..., 122). The metadata engines (120, ..., 122) use respective metadata models to transform queries into lookup vectors in different respective vector spaces, and then use the lookup vectors to identify matching metadata embeddings. The query-augmenting component 110 uses an augmentation model to produce augmented embeddings in yet another vector space. Finally, the retrieval component 112 represents target items using target-item embeddings in the same vector space as the query-augmenting component 110. In other words, the query-augmenting component 110 places augmented embeddings in the same vector space in which the retrieval operation in the third phase is performed.

The technique improves the quality of search results, especially for short input queries having only a few tokens. This is because the metadata added to the input query 104 exposes the intent which likely underlies input query 104. The enhanced input query, in turn, allows the third phase to find a target item that better matches the true meaning of the input query 104.

According to another technical merit, the technique used by the computing system 102 provides a way of efficiently integrating information produced using different independent models, the models being trained using different respective sets of training examples. This characteristic facilitates the development, maintenance, and expansion of the computing system 102. For instance, the technique enables a developer to repurpose a preexisting metadata model in the computing system 102, without retraining the preexisting metadata model, and without retraining any other metadata model in the computing system 102. Further, the technique enables a developer to add a new metadata model to the computing system without retraining the other metadata models. In some implementations, however, these types of changes will require retraining the augmentation model used by the query-augmenting component 110 so that updated augmented embeddings continue to lie in the same vector space as the target items.

Figure 2:
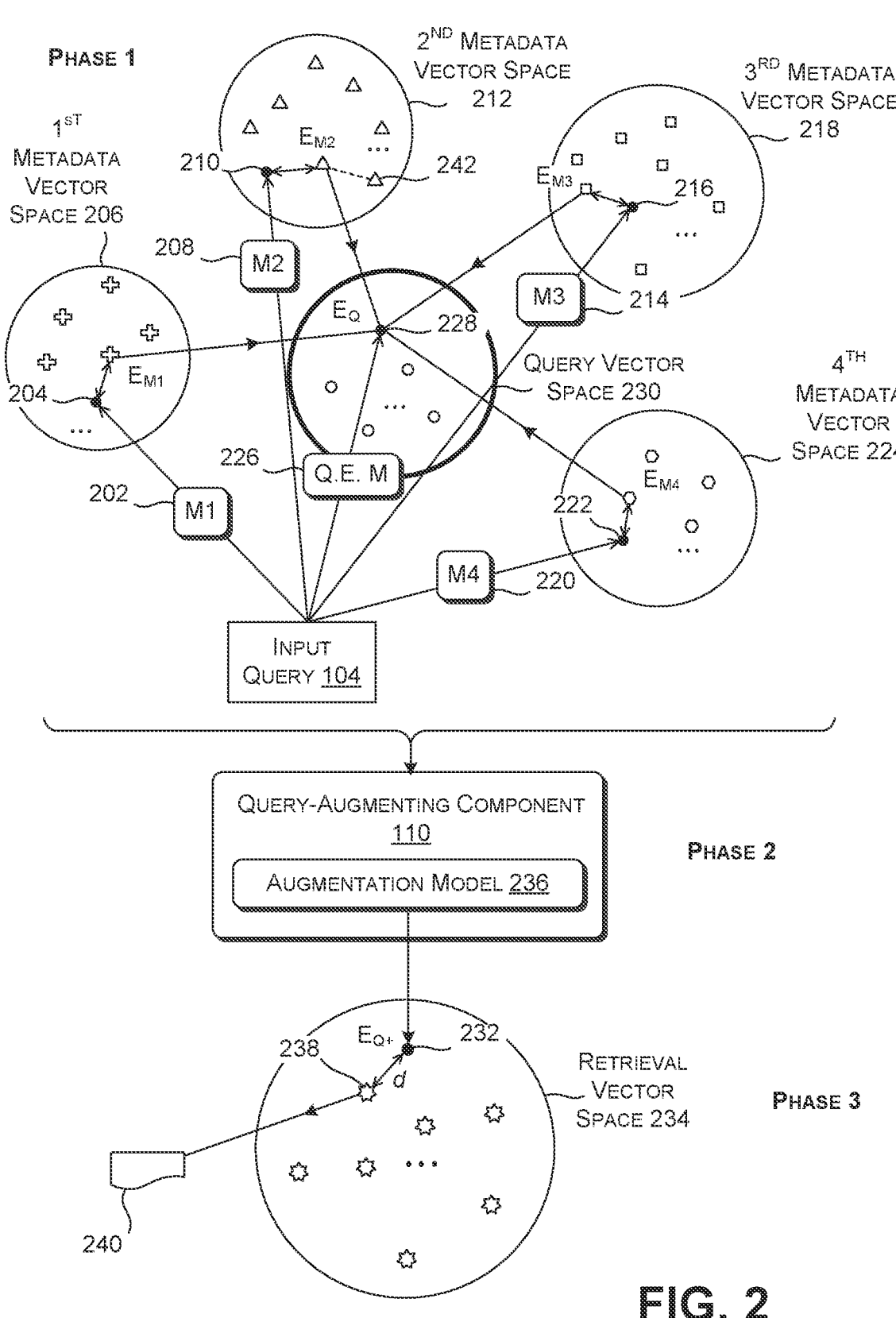
FIG. 2 represents embeddings produced by the computing system of FIG. 1, which are associated with different respective vector spaces.

FIG. 2 illustrates the different embeddings identified by different models, and the manner in which the query-augmenting component 110 combines the different embeddings into an augmented embedding $E_{Q+}$. In a first phase, a first metadata model 202 (M1) transforms the input query 104 to a first lookup vector 204, and then uses the first lookup vector 204 to identify a first metadata embedding $E_{M1}$ in a first metadata vector space 206. A second metadata model 208 (M2) transforms the input query 104 into a second lookup vector 210, and then uses the second lookup vector 210 to identify a second metadata embedding $E_{M2}$ in a second metadata vector space 212. A third metadata model (M4) 214 transforms the input query 104 into a third lookup vector 216, and then uses the third lookup vector 216 to identify a metadata embedding $E_{M3}$ in a third metadata vector space 218. A fourth metadata model 220 (M4) transforms the input query 104 into a fourth lookup vector 222, and the uses the fourth lookup vector 222 to identify a metadata embed ding $E_{M4}$ in a fourth metadata vector space 224. Each of the above-identified metadata embeddings is associated with a particular metadata item. Although FIG. 2 shows the case in which there are four different kinds of metadata, different applications can integrate any number of types of metadata, including less than four types or more than four types. Finally, a query-encoder model 226 (Q.E. M) transforms the input query 104 into a query embedding 228 ($E_Q$) in a query vector space 230.

In some implementations, a training system produces each model using a specific set of training examples. For example, the first metadata model 202 (M1) is trained using a different set of training examples, at least in part, than the second metadata model 208 (M2). In addition, the models can use any combination of architectures and/or sizes (which encompasses the case in which two or more models have the same architecture and/or size). In some implementations, at least one model corresponds to the type of transformer-based language model described below with reference to FIG. 7. Alternatively, or in addition, any model incorporates a convolutional neural network (CNN), a recurrent neural network (RNN), a fully-connected feed-forward network (FFN), a diffusion model, and so on, or any combination thereof.

Embeddings in each vector space have a relationship to each other. In particular, the distance between any pair of vectors in a single vector space reflects the semantic similarity between the concepts associated with the two vectors. Distance can be measured using any distance metric, such as the dot product or cosine similarity. However, in some implementations, an embedding in a particular vector space does not have an a priori relationship to any other embedding in another vector space. This is because these embeddings are produced using independent models, and the models are trained using different sets of training examples. (However, the computing system 102 does not preclude the case in which the training system trains two (or more) models to ensure that a first model produces output results that have some predefined relationship with the output results produced by a second model.)

In the example of FIG. 2, each metadata engine uses a dense retrieval technique to identify metadata embeddings in its vector space. In this approach, in an offline process, the engine's metadata model maps metadata items to respective metadata embeddings. An index stores these metadata embeddings. In an inference stage, the metadata engine uses its metadata model to map the input query 104 to a lookup vector, and then finds the metadata embedding in the index that is closest to the index vector. Additional information regarding this type of retrieval technique is set forth below in connection with FIG. 3.

In a second phase, the query-augmenting component 110 merges the metadata embeddings ($E_{M1}$, $E_{M2}$, $E_{M3}$, $E_4$) into the query embedding 228 ($E_Q$) using a graph convolution operation. This operation involves using any aggregation function to combine the metadata embeddings with the query embedding, to yield a merged embedding. The query-augmenting component 110 then transforms the merged embeddings into an augmented embedding 232 ($E_{Q+}$) in a retrieval vector space 234. An augmentation model 236 performs these two functions.

Overall, the first two phases in the operation of the computing system 102 add context to the user's input query 104. The enhanced input query 104 is more effective at capturing the intent which underlies the input query 104, compared to the original input query 104. The context added to the input query 104 encompasses a broad range of signals relating to the content of the input query 104 itself, the known behavior of the user who submitted the input query 104, and the known behavior of a group of users of which the user is a member. Examples of illustrative metadata items are set forth below.

FIG. 2 also indicates that the target items (e.g., documents or ads) are represented using target-item embeddings (depicted as respective star symbols) in the same retrieval vector space 234 as the augmented embedding 232 ($E_{Q+}$). In some implementations, the retrieval component 112 uses the dense retrieval technique to find the target-item embedding that is closest to the augmented embedding 232 in the vector space 234. In the example of FIG. 2, the retrieval component 112 identifies the target-item embedding 238, which corresponds to a particular target item 240. The output-generating component 116 generates output information 118 which contains the target item 240 (e.g., in the case of an ad), or which makes reference to the target item 240 (e.g., by providing a link to the target item 240).

The use of dense retrieval in the example of FIG. 2 is illustrative. Other implementations use other techniques instead of dense retrieval or in addition to dense retrieval. Examples of such other techniques are set forth below. Other technique vary the dense retrieval approach described above in different ways. For example, in the approach described above, each metadata model converts the input query 104 to a model-specific lookup vector, which is then used to search a model-specific index. In one variation, two or more metadata models are trained to use a common lookup vector. For example, two or more metadata models can be trained to use the query embedding 228 ($E_Q$) itself as the common lookup vector. This would reduce the amount of processing operations by eliminating the step of generating a lookup vector for each metadata model. In another variation, the metadata models generate model-specific lookup vectors (204, 210, 216, 222) as explained above. But, in this variation, the computing system 102 treats the lookup vectors as the final metadata embeddings without performing an index-searching operation. That is, this variation uses the lookup vectors in the graph convolution operation, rather than metadata embeddings found in the indices using the lookup vectors.

Different applications use metadata models that produce different kinds of metadata. The following is a non-exhaustive list of illustrative metadata models for producing metadata.

Related Queries Submitted in Search Sessions. One metadata model identifies one or more queries that have been previously submitted by users in search sessions in which the input query 104 was also submitted. For example, assume that many users who input the query "battery backup" also enter the query "power supply." The metadata model will therefore identify "power supply" when the user enters "battery backup," and vice versa. A variation of this metadata model identifies queries made by the specific user who submitted the input query 104. Alternatively, the metadata model considers prior queries regardless of who submitted them, but boosts the relevance of queries submitted by the user.

Web Pages Selected in Response to Queries. Another metadata model identifies one or more web pages that have been previously selected by users in search sessions in which the input query 104 was also submitted. In some implementations, this metadata model maps the title associated with the web pages to metadata embeddings. A variation of this metadata model identifies web pages selected by the specific user who submitted the input query 104. Alternatively, the metadata model considers prior web page selections regardless of who selected them, but boosts the relevance of web pages previously selected by the user.

Semantically and/or Lexically Related Text. Another metadata model identifies one or more passages of text that are semantically and/or lexically related to at least a portion of the input query 104.

Brand Names Associated with Queries. Another metadata model identifies one or more brands that are associated with the input query 104.

Location of User. Another metadata model receives location information that identifies the location associated with the user. The metadata model can receive location information from various sources, including: a) a Global Positioning System (GPS) system: b) a cell tower with which the user communicates; c) a browser application with which the user is interacting, and so on. Alternatively, or in addition, the location of the user can be approximated based on the location associated with the user's Internet Provider, information provided in a user profile, and so on. The metadata model can leverage location information in various ways, such as by adding text to the input query 104 that identifies the location of the user, and then transforming the thus-augmented query into a query embedding. Alternatively, a scarce retrieval technique can directly operate on the augmented query, as described at the end of this section.

Figure 3:
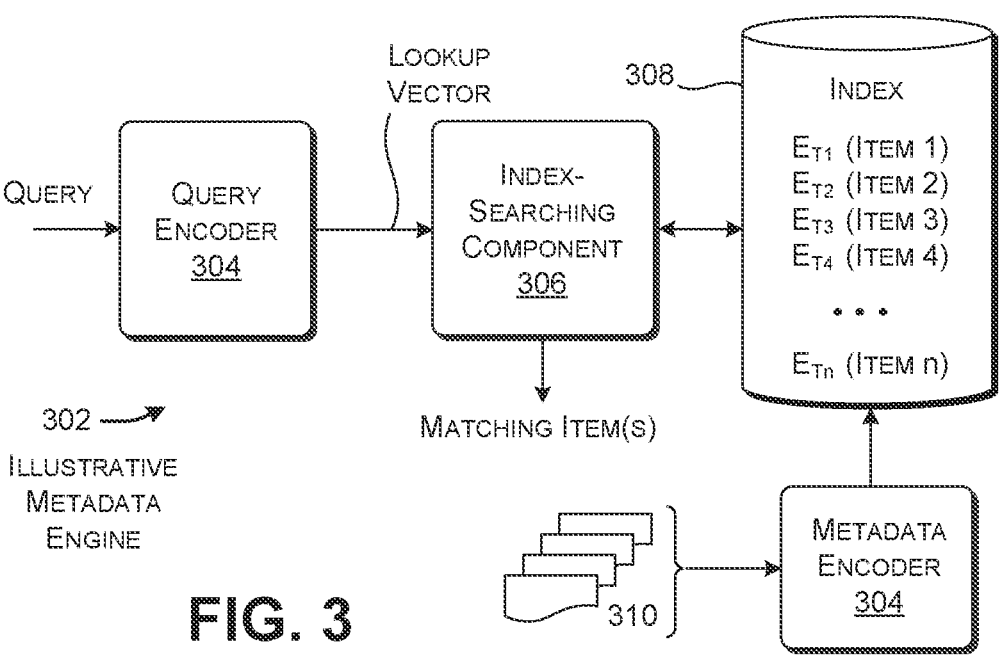
FIG. 3 shows an illustrative machine-trained model that produces metadata embeddings.

FIG. 3 shows an illustrative metadata engine 302, corresponding to one of potentially plural metadata engines used by the metadata-generating system 108. A query encoder 304 uses a metadata model to transform the input query 104 into a lookup vector. An index-searching component 306 searches an index (also referred to as a metadata index) in a data store 308 to find a metadata embedding that is closest to the lookup vector, e.g., as measured using dot product or cosine similarity. Alternatively, the index-searching component 306 finds the best-matching z metadata embeddings, where $1 \leq z$. The index-searching component 306 can perform this search using any technique, such as an exhaustive comparison of the lookup vector with each metadata embedding in the index. Alternatively, the index-searching component 306 uses the approximate nearest neighbor (ANN) technique to explore the index.

Each metadata embedding is associated with a particular instance of metadata. In an offline process, the metadata encoder 304 transforms a plurality of instances of metadata 310 into the metadata embeddings. The offline process adds these embeddings to the index. Each metadata embedding has a reference to the metadata item it represents.

Figure 4:
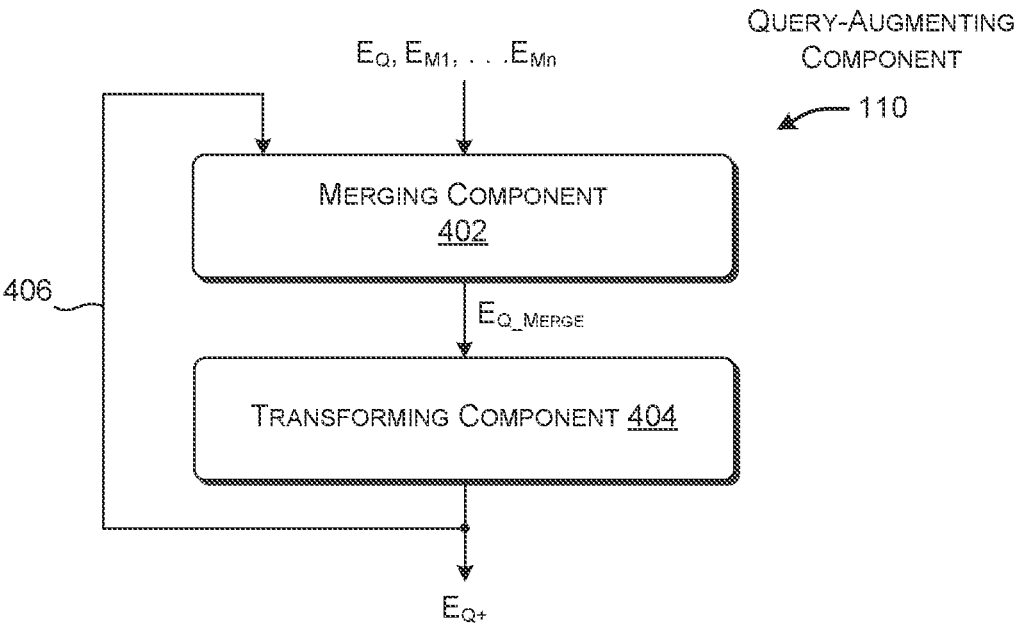
FIG. 4 shows one implementation of a query-augmenting component, which is one component of the computing system of FIG. 1.

FIG. 4 shows one implementation of the query-augmenting component 110, which produces the augmented embedding $E_{Q+}$ using a graph convolutional network. More specifically, a merging component 402 receives the query embedding $E_Q$ produced by the query encoder 106 and one or more metadata embeddings ($E_{M1}$, $E_{M2}$, . . . , $E_{Mn}$) produced by the metadata-generating system 108. The merging component 402 combines the query embedding with the metadata embedding(s) using any aggregation function, such as a summation, average, weighted average, or a graph attention network operation. A graph attention network operation is a kind of weighted average in which a weight assigned to a neighboring node (e.g., a node associated with $E_{M1}$) is based on a machine-trained assessment of the relationship of the neighboring node to a node under consideration (here, the query embedding $E_Q$). Background information on the general topic of graph attention networks can be found at Veličković, et al., "Graph Attention Networks," arXiv, arXiv:1710.10903v3 [stat.ML], Feb. 4, 2018, 12 pages. The output of the merging component is a merged embedding $E_{Q\_merge}$.

A transforming component 404 transforms the merged embedding into an augmented embedding $E_{Q+}$. In some implementations, the transforming component 404 includes a fully-connected neural network having one or more layers that uses a non-linear activation function, such as the sigmoid activation function or the rectilinear linear unit (ReLU) activation function. The merging component 402 and the transforming component 404 represent functions performed by the augmentation model 236 (of FIG. 2).

In some implementations, the query-augmenting component 110 only takes into account metadata embeddings that are direct neighbors of the query embedding 228 ($E_Q$). In the example of FIG. 2, this incudes metadata embeddings $E_{M1}$, $E_{M2}$, $E_{M3}$, and $E_4$. In this case, the query-augmenting component 10 applies the merging component 402 and the transforming component 404 only once to produce the augmented embedding $E_{Q+}$.

In other cases, each directly-linked metadata embedding is linked to one or more other metadata embeddings in the metadata model's vector space. For example, assume that the metadata embedding $E_{M2}$ in the vector space 212 is linked to at least one other metadata embedding 242. To provide a concrete example, assume that the embedding $E_{M2}$ is a web page that is related to the input query 104 because many users have clicked on the web page after entering the input query 104. This web page, in turn, is linked to other web pages. For instance, a link between two web pages can reflect the fact that both web pages are clicked by many users in the same search session, and/or the web pages have similar semantic content. To take account for the influence of these kinds of embeddings, the query-augmenting component. 110 performs the above-described merging and transforming operations plural times over each node of a constellation nodes under consideration, including a node associated with the query embedding, nodes associated with directly-linked metadata embeddings, and nodes associated with indirectly-linked metadata embeddings (e.g., metadata embeddings that are no more than k hops away from the query embedding 228). Loop 406 in FIG. 4 represents the iteration of the merging and transforming operation. This iterative processing has the effect of progressively expanding the universe of embeddings that contribute to the augmented embedding $E_{Q+}$.

Figure 5:
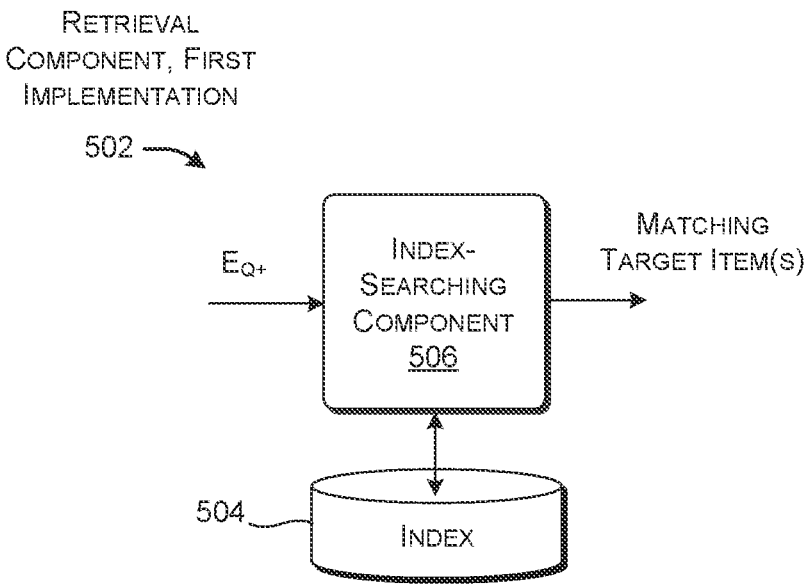
FIG. 5 shows one implementation of a retrieval component that uses a dense retrieval technique, which is another component of the computing system of FIG. 1.

FIG. 5 shows a retrieval component 502 that represents one example of the retrieval component 112 of FIG. 1. Here, the retrieval component 112 uses dense retrieval to search an index (also referred to as a target-item index) in a data store 504 in the same manner as the dense retrieval functionality of FIG. 3. That is, an index-searching component 506 searches the index to find a target-item embedding that is closest to the augmented embedding 232 ($E_{Q+}$) Alternatively, the index-searching component 506 finds the z best-matching target-item embeddings, where $1 \leq z$. The index-searching component 506 performs this task using an exhaustive search of the index or an ANN search. An offline process (not shown) produces the index by mapping different target items (e.g., ads) into the target-item embeddings.

Figure 6:
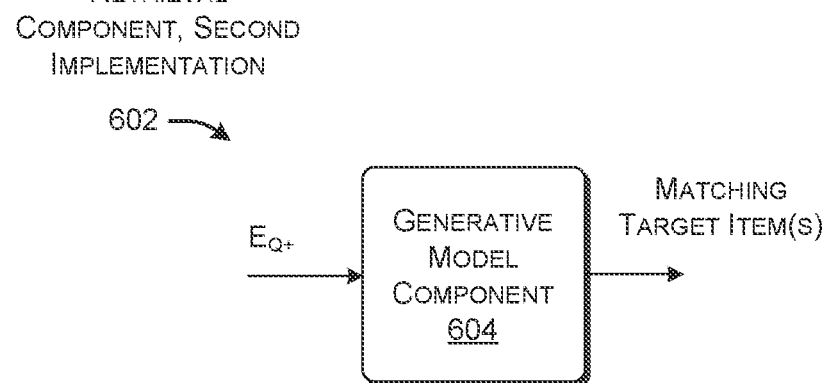
FIG. 6 shows another implementation of the retrieval component of FIG. 1 that uses a generative machine-trained model.

FIG. 6 shows a retrieval component 602 that represents another implementation of the retrieval component 112 of FIG. 1. Here, the retrieval component 602 uses a machine-trained generative model 604 to generate one or more target items based on the augmented embedding $E_{Q+}$. For example, the machine-trained generative model 604 treats the augmented embedding as a prompt, and uses a language model of any kind (such as the kind described in Section B) to autoregressively transform the prompt into at least one item, token by token. Optionally, the prompt prepends instructional context information to the augmented embedding 232 that serves to inform the generative model 604 of the task it is being asked to perform. In the implementation of FIG. 6, the retrieval component 602 dispenses with the use of an index-searching component because the retrieval component 602 directly transforms the augmented embedding 232 into at least one target item (rather than matching the augmented embedding 232 to a preexisting target-item embedding). For instance, the retrieval component 602 transforms the augmented embedding into a keyword (which includes one or more words), and then finds an ad associated with the generated keyword.

Yet another implementation of the retrieval component 112 of FIG. 1 (not shown) uses a scarce retrieval technique. In this approach, the metadata-generating system 108 identifies a textual expression of each metadata item, rather than a metadata embedding that represents the metadata item. The query-augmenting component 110 appends the metadata text to the end (or the beginning) of the text of the actual submitted input query 104. For example, assume that the input query 104 is "High definition TVs on sale." One metadata engine determines that the user's present location is Bellevue, Washington. The query-augmenting component 110 appends "Bellevue" to the input query 104, to yield "High definition TVs on sale Bellevue." Next, the retrieval component 112 uses any sparse search technique to identify one or more target items that match the input query 104. For example, the retrieval component 112 can use Term Frequency-Inverse Document Frequency (TF-IDF) to find at least one matching target item. Alternatively, the retrieval component 112 uses the Okapi BM25 ranking function to identify at least one matching target item.

Further, any metadata engine can use a variety of approaches other than, or in addition to, dense retrieval. For example, in some implementations, a metadata engine uses a generative model to generate a metadata item, or uses a scarce retrieval approach to find a matching metadata item.

In conclusion to Section A, the computing system 102 is able to match the input query 104 with target items with low latency (e.g., a few milliseconds) and with an efficient use of resources (e.g., processing resources and memory resources). This enables the computing system 102 to deliver target items to a user during a search session in a response time that the user perceives as real time. The computing system 102 achieves this result, in part, by using dense retrieval at various stages, which is a resource-efficient and low-latency technique. More specifically, the stages which can incorporate the use dense retrieval include the first stage (providing a query embedding and metadata embeddings) and the third stage (identifying a target item based on the augmented embedding). The second stage (generating the augmented embedding) also makes efficient use of resources and has low latency. This is because, in some implementations, the second stage includes a single aggregating operation followed by a single transforming operation. For frame of reference, an alternative technique that relies heavily on the use of a generative model to produce text is relatively resource-intensive and slow. In part, this is because a generative model typically uses a resource-intensive large language model, and applies this model in autoregressive fashion to generate the output text, token by token.

In some implementations, the resource-efficiency and low-latency performance of the computing system 102 enables the computing system 102 to execute its functions using central processing units (CPUs), rather than specialized accelerator processing functionality (such as graphics processing units (GPUs)). More generally stated, the computing system 102 includes first processing resources for performing first tasks at a first speed and second processing resources for performing second tasks at a second speed, the second speed being greater than the first speed. The resource-efficiency and low-latency performance of the computing system 102 allows the computing system 102 to execute its functions using the first resources at the first speed, without relying on the second resources (in other words, independent of the second resources).

Other search applications also rely on dense retrieval. However, these other techniques do not provide an efficient way of integrating metadata with the input query 104. Hence, these other techniques can potentially provide poor quality results that do not adequately reveal the underlying intent of the user's input query 104. This problem is particularly pronounced for the case of relatively short queries.

A short query, considered by itself, often does not provide enough information to reveal the intent which underlies query.

As previously mentioned, the computing system 102 also applies a technique that is adaptable and scalable. This is because the technique provides a framework for efficiently incorporating metadata embeddings provided by independently-developed machine-trained models. For instance, the technique allows a developer to add a new metadata model without retraining existing metadata models. In some cases, the new metadata model may have been developed for use in a different application, and is being repurposed for use in the computing system 102. In some implementations, however, this new metadata model will require retraining the augmentation model 236 used by the query-augmenting component 110. More generally stated, a metadata model executes a function in the computing system 102 of FIG. 1 using weights that were trained in a context of a technique other than the technique performed by the computing system 102. Further, a new metadata model can be added to the computing system 102 without retraining an existing metadata engine in the computing system 102 (or the query-encoder model 226 that produces query embeddings).

Section B. Illustrative Language Model

Figure 7:
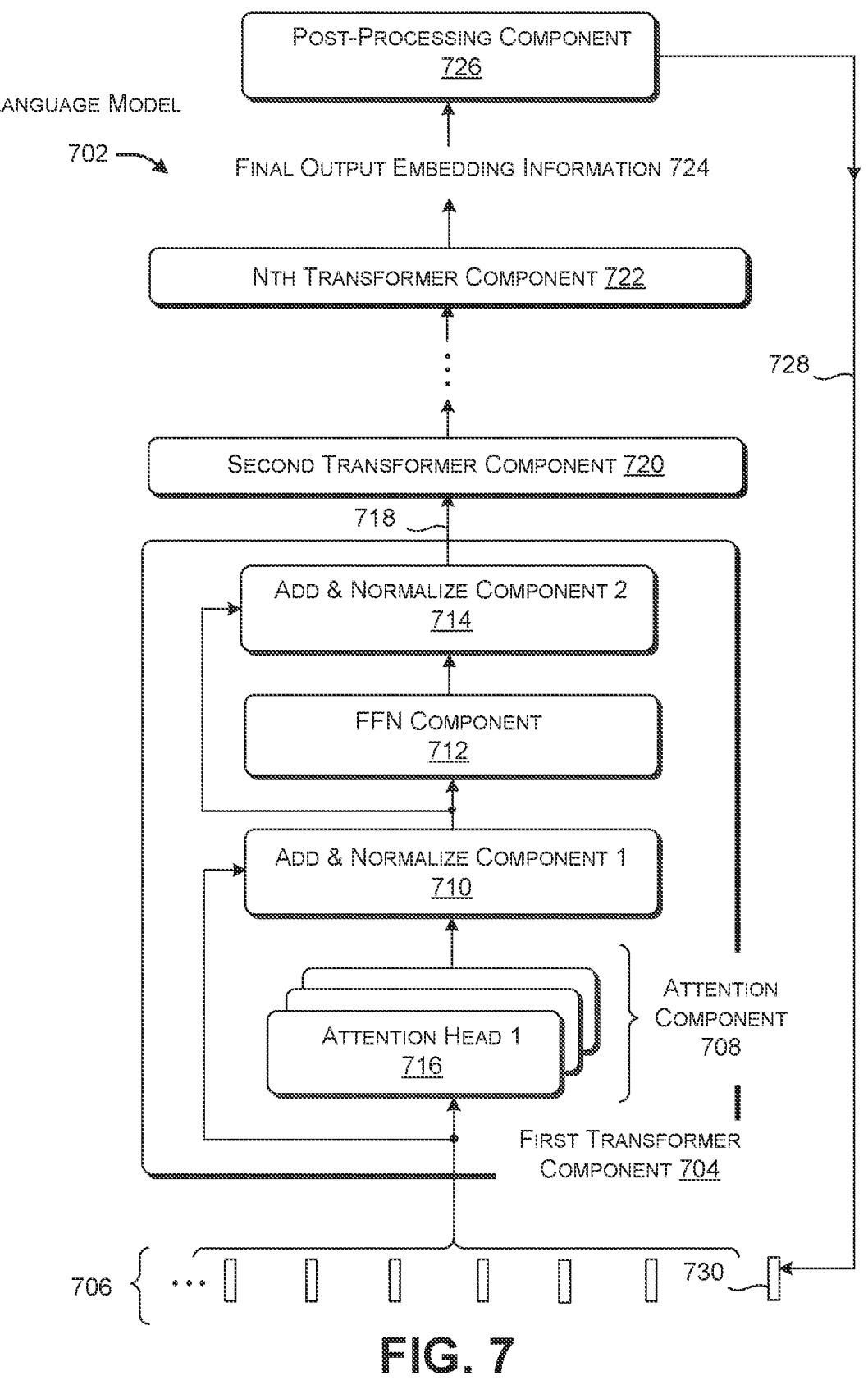
FIG. 7 shows a language model that, in some implementations, is used to implement one or more machine-trained models used in the computing system of FIG. 1.

FIG. 7 shows one implementation of a machine-trained language model 702 that can be used to transform text into an embedding. When operating in an auto-generative mode, the language model 702 can also transform input text into output text, token by token.

The language model 702 is composed, in part, of a pipeline of transformer components, including a first transformer component 704. FIG. 7 provides details regarding one way to implement the first transformer component 704. Although not specifically illustrated, other transformer components of the language model 702 have the same architecture and perform the same functions as the first transformer component 704 (but are governed by separate sets of weights).

The language model 702 commences its operation with the receipt of an instance of text, such as the input query 104 or a target item. A tokenizer breaks the input text into a series of text tokens. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the language model 702 operates on any of: audio information, image information, video information, sensor information, finance-related information, and so on, or any combination thereof. Optionally, the language model 702 also prepends a special [CLS] token to the beginning of the text tokens.

Next, an embedding component (not shown) maps the sequence of tokens into respective token embeddings. For example, the embedding component can produce one-hot vectors that describe the tokens, and can then map the one-hot vectors into the token embeddings using a machine-trained linear transformation. The embedding component then adds position information (and, in some cases, segment information) to the respective token embeddings to produce position-supplemented embedding vectors 706. The position information added to each token embedding describes the embedding vector's position in the sequence of token embeddings.

The first transformer component 704 operates on the position-supplemented embed ding vectors 706. In some implementations, the first transformer component 704 includes, in order, an attention component 708, a first add-and-normalize component 710, a feed-forward neural network (FFN) component 712, and a second add-and-normalize component 714.

The attention component 708 performs attention analysis using the following equation:

$$attn\,(Q, K, V) = \text{Softmax}\left(\frac{QK^T}{\sqrt{d}}\right)V. \tag{1}$$

The attention component 708 produces query information Q by multiplying the position-supplemented embedding vectors 706 by a query weighting matrix $W^Q$. Similarly, the attention component 708 produces key information K and value information V by multiplying the position-supplemented embedding vectors 706 by a key weighting matrix $W^K$ and a value weighting matrix $W^V$, respectively. To execute Equation (1), the attention component 708 takes the dot product of Q with the transpose of K, and then divides the dot product by a scaling factor $\sqrt{d}$, to produce a scaled result. The symbol d represents the dimensionality of Q and K. The attention component 708 takes the Softmax (normalized exponential function) of the scaled result, and then multiplies the result of the Softmax operation by V, to produce attention output information. More generally stated, the attention component 708 determines how much emphasis should be placed on each part of input embedding information when interpreting other parts of the input embedding information, and when interpreting the same part. In some cases, the attention component 708 is said to perform masked attention insofar as the attention component 708 masks output token information that, at any given time, has not yet been determined. Background information regarding the general concept of attention is provided in Vaswani, et al., "Attention Is All You Need," in 31st Conference on Neural Information Processing Systems (NTPS 2017), 2017, 9 pages.

Note that FIG. 7 shows that the attention component 708 is composed of plural attention heads, including a representative attention head 716. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 708 concatenates the output results of the attention component's separate attention heads, and then multiplies the results of this concatenation by another weight matrix $W^O$.

The add-and-normalize component 710 includes a residual connection that combines (e.g., sums) input information fed to the attention component 708 with the output information generated by the attention component 708. The add-and-normalize component 710 then normalizes the output information generated by the residual connection, e.g., by normalizing values in the output information based on the mean and standard deviation of those values. The other add-and-normalize component 714 performs the same functions as the first-mentioned add-and-normalize component 710. The FFN component 712 transforms input information to output information using a feed-forward neural network having any number of layers.

The first transformer component 704 produces output embedding information 718. A series of other transformer components (720, . . . , 722) perform the same functions as the first transformer component 704, each operating on output embedding information produced by its immediately preceding transformer component. Each transformer component uses its own level-specific set of machine-trained weights. The final transformer component 722 in the language model 702 produces final output embedding information 724.

In some implementations, the final output embedding information 724 constitutes the final result of the language model 702. For instance, consider the case in which a [CLS] token is added to the beginning of the input query's text tokens. The vector in the output embedding information 724 that is associated with this [CLS] token encodes information regarding the input query 104 as a whole, and can be used as a query embedding $E_Q$ or a lookup vector. In another case, a pooling layer of any type consolidates the vectors in the final output embedding information 724, to produce a single vector that can be used as a query embedding $E_Q$ or a lookup vector.

When applied in a generative application, a post-processing component 726 performs post-processing operations on the final output embedding information 724. For example, the post-processing component 726 performs a machine-trained linear transformation on the final output embedding information 724, and processes the results of this transformation using a Softmax component (not shown). The language model 702 uses the output of the post-processing component 726 to predict the next token in the input sequence of tokens. The language model 702 performs this task using a greedy selection approach (e.g., by selecting the token having the highest probability), or by using the beam search algorithm (e.g., by traversing a tree that expresses a search space of candidate next tokens).

In a generative application, the language model 702 operates in an auto-regressive manner, as indicated by the loop 728. To operate in this way, the language model 702 appends the predicted token to the end of the sequence of input tokens, to provide an updated sequence of tokens. The predicted token leads to the production of a new position-supplemented vector 730. In a next pass, the language model 702 processes the updated sequence of position-supplemented vectors to generate a next predicted token. The language model 702 repeats the above process until it generates a specified stop token.

The above-described implementation of the model 702 relies on a decoder-only architecture. Other implementations of the model 702 use an encoder-decoder transformer-based architecture. Here, a decoder receives encoder output information produced by an encoder, together with decoder input information. Other implementations of the language model 702 use other kinds of machine-trained models besides, or in addition to, the particular transformer-based architecture shown in FIG. 7. The other machine-trained models include any of CNNs, RNNs, FFNs, stable diffusion models, etc., or any combination thereof.

Note that large language models are typically resource-intensive in nature. To address this issue, the training system (described in Section C) can produce a reduced-size version of a language model. (The size of model reflects the number of parameters it uses.) One way to reduce the number of parameters in a language model is to train the model using a teacher-student approach. Here, a large teacher model iteratively instills its knowledge in a lighter-weight student model, e.g., by providing ground-truth output results that are used to train the student model. Once trained, the computing system 102 uses the student model in lieu of the more capable teacher model. Use of a lighter-weight version of a language model in the computing system 102 is justified because the range of tasks that the language model is asked to perform is more limited compared to a service provided by a general-purpose chat engine, for instance.

Section C. Illustrative Training Systems

Figure 8:
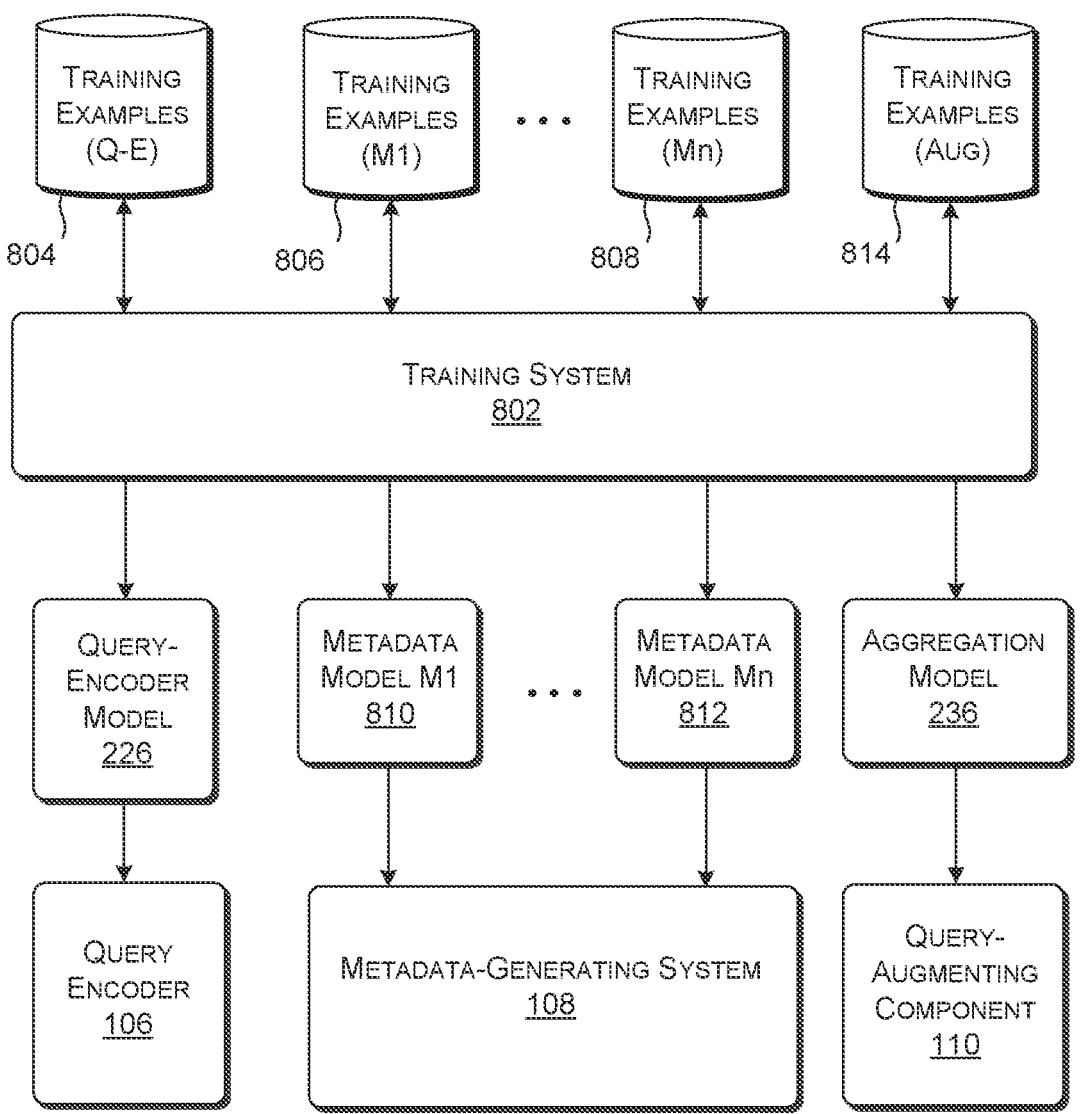
FIG. 8 shows a training system for training the machine-trained models used in the computing system of FIG. 1.

FIG. 8 shows one example of a training system 802 that independently trains the various models used in the computing system 102. For instance, the training system 802 uses a set of training examples in a data store 804 to train the query-encoder model 226 used by the query encoder 106. The training system 802 uses one or more sets of training examples in data stores (806, . . . , 808) to train respective metadata models (810, . . . , 812) used by the various metadata engines of the metadata-generating system 108, such as the metadata models 202, 208, 214, and 220 of FIG. 2. Further, the training system 802 uses a set of training examples in a data store 814 to train the augmentation model 236 used by the query-augmenting component 110. The above-mentioned models (226, 810, . . . , 812, and 236) produce embedding is in different respective vector spaces. The target-item embeddings are produced so that they lie in the same vector space used by the augmentation model 236.

Each training example identifies an example of input information to be fed to a model (such as a query), together with a ground-truth output result that is accepted as a correct transformation of the input information. For example, in the case of a metadata model, a training example may include an input query 104 and a metadata item that is considered an appropriate match for the metadata item. During training of each model, the training system 802 produces a model-generated output result for each instance of input information in its set of training examples. The training system 802 uses a loss function (e.g., a cross entropy loss function) to compute the difference between the model-generated output result and the ground-truth output result. The training system 802 then use stochastic gradient descent in combination with back-projection to update the weights of the model being trained based on the loss information produced by the loss function.

In some implementations, the above-described training is performed by fine-tuning a pre-trained language model. Background on the general task of pre-training language models is provided in Devlin, et al., "BERT: Pre-training of Deep Bidirectional Transformers for Language Understanding," arXiv, Cornell University, arXiv:18110.04805v2 [cs.CL]. May 24, 2019, 16 pages, and Radford, et al,"Improving Language Understanding by Generative Pre-Training," OpenAI, San Francisco, California, Jun. 11, 2018, 12 pages. One example of a publicly-available pre-trained model language model is the BLOOM model available from HUGGING FACE, INC., of New York, New York, one version of which is Version 1.3 released on Jul. 6, 2022.

Figure 9:
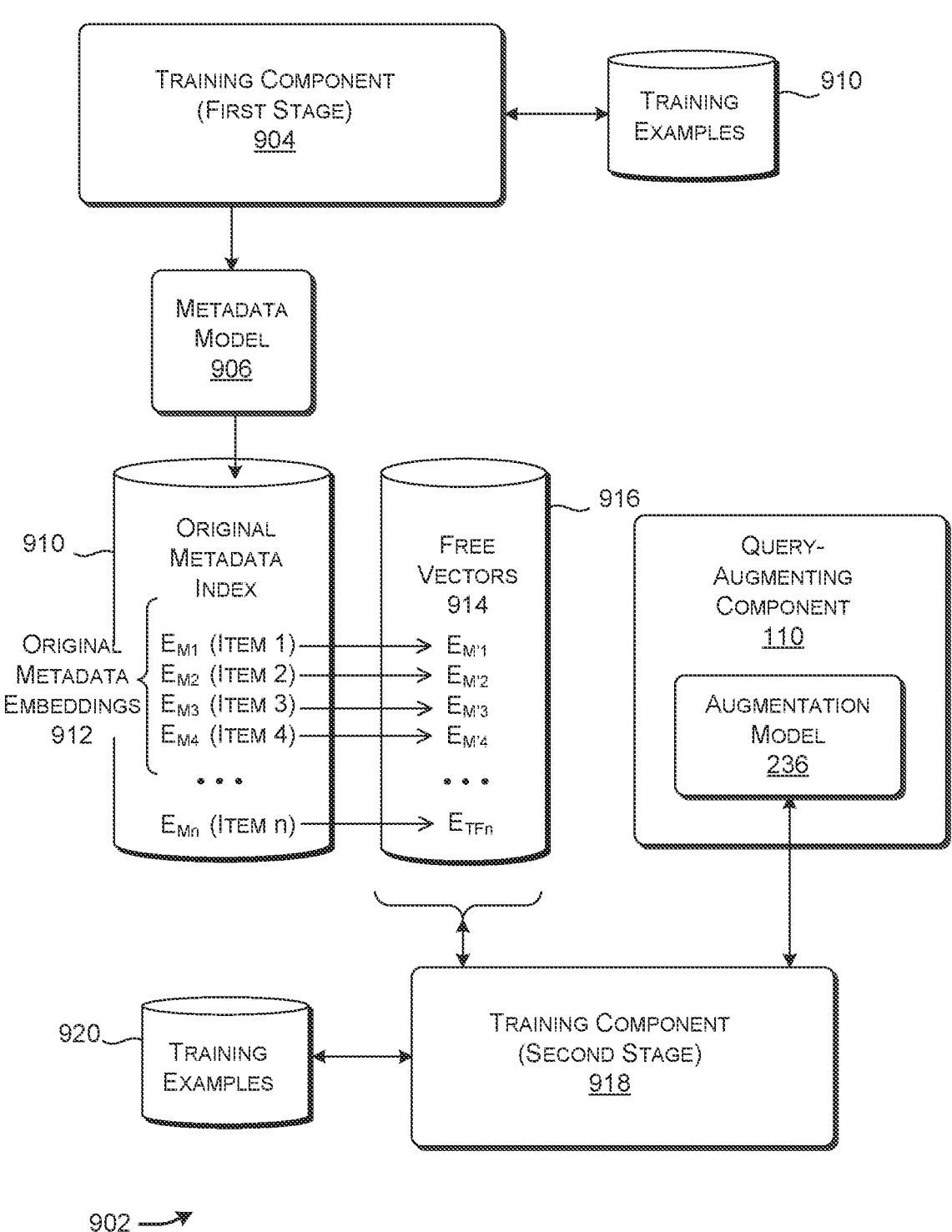
FIG. 9 shows another training system for training the machine-trained models used in the computing system of FIG. 1.

FIG. 9 shows another training system 902 for producing the models used by the computing system 102 of FIG. 1. The training system 902 performs its training in at least two stages. In a first phase, a training component 904 produces at least one metadata model 906 based on a set of training examples in a data store 908. The metadata model 906 is used to create a searchable metadata index provided in a data store 910. The metadata index provides a set of original metadata embeddings 912. At inference time, a metadata engine uses the metadata index to find a metadata embedding that is closest to a lookup vector (where the lookup vector is produced by transforming an input query 104 using the metadata model 906).

Each metadata model performs its training in independent fashion, that is, without considering the role it will serve in the computing system 102. This manner of training introduces a risk that the process of adding metadata information to the input query 104 can change the intent underlying the original input query 104. This is particularly problematic in an advertising context in which an advertiser explicitly specifies the level of exactness at which an input query 104 is considered a match for an advertisement. For example, in some cases, an advertiser specifies the level of exactness at which an input query 104 is considered a valid match for a keyword on which the advertiser has bid (in which the keyword is made up of a single word, a phrase, etc.). In other cases, an advertiser specifies that an input query 104 is considered a good match for an advertisement if the input query 104 semantically matches the content of a specified web page (or pages) with a specified degree of precision. In these cases, the advertiser will not be well served if the meaning of the input query 104 is changed, expanded, and/or diluted in a way that overrides or circumvents the matching criteria specified by the advertiser. More specifically, the unwanted modification of the original input query's intent can lead to the delivery of target items to users that do not match their current interests, which reduces their engagement with the target items.

To address this situation, the training system 902 applies an adapter strategy to more effectively ensure that the metadata information added to the input query 104 is aligned with the true intent of the input query 104. More specifically, the training system 902 creates an index of free vectors 914 (also referred to as free-value embeddings) in a data store 916 which have a one-to-one correspondence with corresponding original metadata embeddings 912 in the data store 910. For example, a first metadata embedding in the data store 910 is associated with a first free vector in the data store 916. At the beginning of a training operation, the values of a free vector are initialized to random values, or any other specified arbitrary values. A training component 918 iteratively updates the weights of these free vectors as it trains the augmentation model 236 used by the query-augmenting component 110, based on a set of training examples in a data store 920. This joint training of the vectors and the augmentation model 236 has the end result of more effectively aligning the metadata information with ground-truth information on which the entire computing system 102 is trained. As a further consequence, the training system 902 will be less likely to change the intent of the input query 104 in an unacceptable manner.

Other end-to-end training solutions are possible. For example, another implementation of the training system 902 trains all models used by the computing system 102, or a subset of the models, at the same time in end-to-end fashion. In this case, the jointly-trained models used by the separate components shown in FIG. 1 can be viewed as part of a single machine-trained model.

Section D. Illustrative Processes

FIGS. 10-12 show three processes that represent an overview of the operation of the computing system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 13 and 14.

More specifically, FIG. 10 shows a process 1002 for identifying one or more target items that match the input query 104. In block 1004, the computing system 102 receives the input query 104. In block 1006, the computing system 102 encodes the input query 104 into a query embedding $E_Q$ (e.g., the query embedding 228) using a first machine-trained model (e.g., the query-encoder model 226) that is trained using a first set of training examples (e.g., the training examples in the data store 804), the query embedding being a vector in a first vector space (e.g., the vector space 230). In block 1008, the computing system 102 produces a metadata embedding $E_{M1}$ based on the input query 104, using a second machine-trained model (e.g., the metadata model 202) that is produced using a second set of training examples (e.g., the training examples in the data store 806), the metadata embedding being associated with a particular instance of metadata and being a vector in a second vector space (e.g., the vector space 206). In block 1010, the computing system 102 combines the query embedding with the metadata embedding using a third machine-trained model (e.g., the augmentation model 236) that is produced using a third set of training examples (e.g., the training examples in the data store 814), to produce an augmented embedding $E_{Q+}$ (e.g., the augmented embedding 232), the augmented embedding being a vector in a third vector space (e.g., the vector space 234). In block 1012, the computing system 102 identifies a target item (e.g., the target item 240) based on the augmented embedding. In block 1014, the computing system 102 generates output information (e.g., the output information 118) for presentation by an output device, the output information including the target item or a reference to the target item. The first vector space, second vector space, and third vector space are three different and independent vector spaces, and the first set of training examples, the second set of training examples, and the third set of training examples are, at least in part, different sets of training examples.

FIG. 11 shows another process 1102 for identifying one or more target items that match the input query 104. In block 1104, the computing system 102 receives the input query 104. In block 1106, the computing system 102 encodes the input query 104 into a query embedding $E_Q$ (e.g., the query embedding 228) using a first machine-trained model (e.g., the query-encoder model 226). In block 1108, the computing system 102 produces a metadata embedding $E_M$ based on the input query 104 using a second machine-trained model (e.g., the metadata model 202), the metadata embedding being associated with a particular instance of metadata. In block 1110, in a graph convolution operation performed using a third machine-trained model (e.g., the augmentation model 236), the computing system 102 merges the query embedding with the metadata embedding, to produce a merged embedding, and transforms the merged embedding to an augmented embedding $E_{Q+}$ (e.g., the augmented embedding 232). In block 1112, the computing system 102 searches an index to find a target-item embedding (e.g., the target-item embedding 238) that is closest to the augmented embedding, the target item embedding being associated with a target item (e.g., the target item 240). In block 1114, the computing system 102 generates output information (e.g., the output information 118) for presentation by an output device, the output information 118 including the target item or a reference to the target item.

FIG. 12 shows another process 1202 for identifying one or more target items that match the input query 104. In block 1204, the computing system 102 receives the input query 104. In block 1206, the computing system 102 encodes the input query 104 into a query embedding (e.g., the query embedding 228). In block 1208, the computing system 102 maps the input query 104 into a lookup vector. In block 1210, the computing system 102 searches an index to find an original metadata embedding that is closest to the lookup vector. In block 1212, the computing system 102 associates the original metadata embedding with a free-value embedding, the free-value embedding being one of a plurality of free-value embeddings (e.g., the free vectors 916). In block 1214, the computing system 102 combines the query embedding with the free-value embedding using a machine-trained model (e.g., the augmentation component 236), to produce an augmented embedding (e.g., the augmented embedding 232). The machine-trained model is trained together with the free-value embeddings. In block 1216, the computing system 102 identifies a target item (e.g., the target item 240) based on the augmented embedding. In block 1218, the computing system 102 generates output information (e.g., the output information 118) for presentation by an output device, the output information including the target item or a reference to the target item.

Section E. Illustrative Computing Functionality

FIG. 13 shows computing equipment 1302 that, in some implementations, is used to implement the computing system 102 of FIG. 1 and the training systems (802, 902) of FIGS. 8 and 9. The computing equipment 1302 includes a set of local devices 1304 coupled to a set of servers 1306 via a computer network 1308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1308 is implemented as a local area network, a wide area network (e.g., the Internet), one or more point-to-point links, or any combination thereof.

The overlapping box in FIG. 13 indicates that the functionality of the computing system 102 is capable of being spread across the local devices 1304 and/or the servers 1306 in any manner. Likewise, the functionality of the training systems (802, 902) is capable of being distributed over the local devices and/or the servers 1306 in any manner. For instance, in some cases, each local device, or a group of affiliated local devices, implements the entirety the computing system 102. In other implementations, the servers 1306 implement the entirety of the computing system 102. Here, an individual user interacts with the servers 1306 via a browser application or other local functionality provided by a local device. In other implementations, the functions of the computing system 102 are distributed between each local device and the servers 1306. For example, in one case, each local device implements the first phase of the processing performed by the computing system 102, and the servers 1306 implement the second and third phases of the processing.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 13. In all cases, the computing system 1402 represents a physical and tangible processing mechanism.

The computing system 1402 includes a processing system 1404 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), and/or one or more Tensor Processing Units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes one or more solid-state devices, one or more magnetic hard disks, one or more optical disks, magnetic tape, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described in with reference to FIGS. 10-12. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some Implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to one aspect, a method (e.g., the process 1002) is described for identifying one or more target items that match an input query (e.g., the input query 104). The method incudes: receiving (e.g., in block 1004) the input query; encoding (in block 1006) the input query into a query embedding (e.g., the query embedding 228) using a first machine-trained model (e.g., the model 226) that is trained using a first set of training examples (e.g., the examples in the data store 804), the query embedding being a vector in a first vector space (e.g., the vector space 230); producing (in block 1008) a metadata embedding based on the input query using a second machine-trained model (e.g., the model 202) that is produced using a second set of training examples (e.g., the examples in the data store 806), the metadata embedding being associated with a particular instance of metadata and being a vector in a second vector space (e.g., the vector space 206); combining (in block 1010) the query embedding with the metadata embedding using a third machine-trained model (e.g., the model 236) that is produced using a third set of training examples (e.g., the examples in the data store 814), to produce an augmented embedding (e.g., the embedding 232), the augmented embedding being a vector in a third vector space (e.g., the vector space 234); identifying (in block 1012) a target item (e.g., the target item 240) based on the augmented embedding; and generating (e.g., in block 1014) output information (e.g., the output information 118) for presentation by an output device (e.g., the output devices 1418), the output information including the target item or a reference to the target item. The first vector space, second vector space, and third vector space being three different and independent vector spaces, and the first set of training examples, the second set of training examples, and the third set of training examples being, at least in part, different sets of training examples.

(A2) According to some implementations of the method of A 1, the producing includes producing plural metadata embeddings based on the input query, wherein the combining includes combining the query embedding with the plural metadata embeddings.

(A3) According to some implementations of the method of A2, the plural metadata embeddings are vectors in different respective vector spaces.

(A4) According to some implementations of any of the methods of A1-A3, the particular instance of metadata is a related query, the input query that is received and the related query having been submitted in a same search session on prior occasions.

(A5) According to some implementations of the method of A4, the particular instance of metadata is a web page that has been selected in response to submission of the input query on prior occasions.

(A6) According to some implementations of the any of the methods of A1-A5, the particular instance of metadata is text that is semantically and/or lexically similar to the input query.

(A7) According to some implementations of any of the methods of A1-A6, the particular instance of metadata is a brand name associated with the input query.

(A8) According to some implementations of any of the methods of A1-A7, the combining is performed using a graphical convolution operation.

(A9) According to some implementations of the method of A8, the graphical convolution operation includes: merging the query embedding with the metadata embedding, to produce a merged embedding; and transforming the merged embedding into the augmented embedding.

(A10) According to some implementations of the method of A9, the merging includes combining the query embedding with the metadata embedding using an aggregation function.

(A11) According to some implementations of the methods of A9 or A10, the transforming includes using a neural network having a non-linear activation function to convert the merged embedding into the augmented embedding.

(A12) According to some implementations of any of the method of A9-A11, the merging and transforming are repeated at least one additional time.

(A13) According to some implementations of any of the methods of A1-A12, the second machine-trained model generates the metadata embedding by: mapping the input query into a lookup vector; and searching an index to find a target metadata embedding that is closest to the lookup vector in the second vector space, the target metadata embedding being the metadata embedding that is combined with the query embedding.

(A14) According to some implementations of any of the methods of A1-A13, the second machine-trained model generates the metadata embedding by: mapping the input query into a lookup vector; searching an index to find an original metadata embedding that is closest to the lookup vector in the second vector space; and associating the original metadata embedding with a free-value embedding, the free-value embedding being combined with the query embedding rather than the original metadata embedding, the free-value embedding being one of a plurality of free-value embeddings, the free-value embeddings being trained together with the third machine-trained model.

(A15) According to some implementations of any of the methods of A1-A14, the identifying includes searching an index to find a target-item embedding that is closest to the aggregated embedding in the third vector space, the target-item embedding being associated with the target item.

(A16) According to some implementations of any of the methods of A1-A15, the identifying includes using a generative machine-trained model to generate the target item based on the augmented embedding.

(A17) According to some implementations of any of the methods of A1-A16, the target item is a digital ad or a document.

(A15) According to some implementations of any of the methods of A1-17, the method is performed using a computing system that has first processing resources for performing first tasks at a first speed and second processing resources for performing second tasks at a second speed, the second speed being greater than the first speed. The computing system performs the method using the first resources at the first speed, independent of the second resources.

(A19) According to some implementations of any of the methods of A1-18, the second machine-trained model operates in the method of A1 using weights that were trained in a method that differs from the method of A1.

(A20) According to some implementations of any of the method of A1-19, further including introducing another machine-trained model for providing metadata embeddings without retraining the first machine-trained model or the second machine-trained model.

(B1) According to another aspect, a method (e.g., the process 1102) is described for identifying one or more target items that match an input query (e.g., the input query). The method includes: receiving (e.g., in block 1104) the input query; encoding (e.g., in block 1106) the input query into a query embedding (e.g., the query embedding 228) using a first machine-trained model (e.g., the model 226); producing (e.g., in block 1108) a metadata embedding based on the input query using a second machine-trained model (e.g., the model 202), the metadata embedding being associated with a particular instance of metadata; in a graph convolution operation performed using a third machine-trained model (e.g., the model 236), merging (e.g., in block 1110) the query embedding with the metadata embedding, to produce a merged embedding, and transforming the merged embedding to an augmented embedding (e.g., the embedding 232); searching (e.g., in block 1112) a target-item index to find a target-item embedding (e.g., the target item embedding 238) that is closest to the augmented embedding, the target item embedding being associated with a target item (e.g., the target item 240); and generating (e.g., in block 1114) output information (e.g., the output information 118) for presentation by an output device (e.g., the output devices 1418), the output information including the target item or a reference to the target item.

(C1) According to another aspect, a method (e.g., the process 1202) is described for identifying one or more target items that match an input query (e.g., the input query 104). The method incudes: receiving (e.g., in block 1204) the input query; encoding (e.g., in block 1206) the input query into a query embedding (e.g., the query embedding 228); mapping (e.g., in block 1208) the input query into a lookup vector; searching (e.g., in block 1210) an index (e.g., the index in a data store 910) to find an original metadata embedding that is closest to the lookup vector; and associating (e.g., in block 1212) the original metadata embedding with a free-value embedding, the free-value embedding being one of a plurality of free-value embeddings; combining (e.g., in block 1214) the query embedding with the free-value embedding using a machine-trained model (e.g., the model 236), to produce an augmented embedding (e.g., the embedding 232), the machine-trained model being trained together with the free-value embeddings; identifying (e.g., in block 1216) a target item (e.g., the target item 240) based on the augmented embedding; and generating (e.g., in block 1218) output information (e.g., the output information 118) for presentation by an output device (e.g. the output devices 1418), the output information including the target item or a reference to the target item.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-read able instructions (e.g., information 1408). The processing system executes the computer-readable instructions to perform any of the methods described herein (e.g., any individual method of the methods of A1-A20, B1, or C1).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operations in any individual method of the methods of A1-A20, B1, or C1).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1412 of FIG. 14. In some examples, the term "logic" likewise encompasses various physical and tangible mechanisms for performing a task. For instance, each processing-related operation illustrated in the flowcharts of FIGS. 10-12 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying one or more target items that match an input query in an inference stage, following training, comprising:

receiving the input query;

encoding the input query into a query embedding using a first machine-trained model that is trained using a first set of training examples, the query embedding being a vector in a first vector space;

producing a metadata embedding based on the input query using a second machine-trained model that has been produced using a second set of training examples and that has been trained independently of the first machine-trained model, the metadata embedding being associated with a particular instance of metadata and being a vector in a second vector space that is independent of the first vector space;

combining the query embedding with the metadata embedding using a third machine-trained model that has been produced using a third set of training examples, to produce an augmented embedding, the augmented embedding being a vector in a third vector space;

identifying a target item based on the augmented embedding; and generating output information for presentation by an output device, the output information including the target item or a reference to the target item, the first vector space, second vector space, and third vector space being three different vector spaces, and the first set of training examples, the second set of training examples, and the third set of training examples being, at least in part, different sets of training examples.

2. The method of claim 1, wherein the producing includes producing plural metadata embeddings based on the input query using plural respective machine-trained models, and wherein the combining includes combining the query embedding with the plural metadata embeddings.

3. The method of claim 2, wherein the plural machine-trained models that produce the plural metadata embeddings have been independently trained, and wherein the plural metadata embeddings are vectors in different respective vector spaces.

4. The method of claim 1, wherein the particular instance of metadata comprises a related query, the input query that is received and the related query having been submitted in a same search session on prior occasions.

5. The method of claim 1, wherein the particular instance of metadata comprises:

a web page that has been selected in response to submission of the input query on prior occasions; and/or text that is semantically and/or lexically similar to the input query; and/or a brand name associated with the input query.

6. The method of claim 1, wherein the combining is performed using a graphical convolution operation.

7. The method of claim 6, wherein the graphical convolution operation comprises:

merging the query embedding with the metadata embedding, to produce a merged embedding; and transforming the merged embedding into the augmented embedding.

8. The method of claim 7, wherein the merging comprises combining the query embedding with the metadata embedding using an aggregation function.

9. The method of claim 7, wherein the transforming comprises using a neural network having a non-linear activation function to convert the merged embedding into the augmented embedding.

10. The method of claim 7, wherein the merging and transforming are repeated at least one additional time.

11. The method of claim 1, wherein the second machine-trained model generates the metadata embedding by:

mapping the input query into a lookup vector; and searching an index to find a target metadata embedding that is closest to the lookup vector in the second vector space, the target metadata embedding being the metadata embedding that is combined with the query embedding.

12. The method of claim 1, wherein the second machine-trained model generates the metadata embedding by:

mapping the input query into a lookup vector;

searching an index to find an original metadata embedding that is closest to the lookup vector in the second vector space; and associating the original metadata embedding with a free-value embedding, the free-value embedding being combined with the query embedding rather than the original metadata embedding, the free-value embedding being one of a plurality of free-value embeddings, the free-value embeddings being trained together with the third machine-trained model.

13. The method of claim 1, wherein the identifying comprises searching an index to find a target-item embedding that is closest to the aggregated embedding in the third vector space, the target-item embedding being associated with the target item.

14. The method of claim 1, wherein the identifying comprises using a generative machine-trained model to generate the target item based on the augmented embedding.

15. The method of claim 1, wherein the target item is a digital ad or a document.

16. A computing system for identifying one or more target items that match an input query in an inference stage, following training, comprising:

an instruction data store for storing computer-readable instructions;

a processing system for executing the computer-readable instructions in the data store, to perform operations including:

receiving the input query;

encoding the input query into a query embedding using a first machine-trained model;

producing a metadata embedding based on the input query using a second machine-trained model that has been trained independently of the first machine-trained model, the metadata embedding being associated with a particular instance of metadata;

in a graph convolution operation performed using a third machine-trained model, merging the query embedding with the metadata embedding, to produce a merged embedding, and transforming the merged embedding to an augmented embedding;

searching a target-item index to find a target-item embedding that is closest to the augmented embedding, the target item embedding being associated with a target item; and generating output information for presentation by an output device, the output information including the target item or a reference to the target item, wherein the query embedding is in a first vector space, the metadata embedding is in a second vector space, and the augmented embedding and the target-item embedding are in a third vector space, wherein the first vector space, the second vector space, and the third vector space are three different vector spaces, and wherein the second vector space is independent of the first vector space.

17. The computing system of claim 16, wherein the producing includes producing plural metadata embeddings based on the input query using plural respective machine-trained models that have been independently trained, wherein the combining includes combining the query embedding with the plural metadata embeddings, and wherein the plural metadata embeddings are vectors in different respective vector spaces.

18. The computing system of claim 16, wherein the second machine-trained model generates the metadata embedding by:

mapping the input query into a lookup vector;

searching a metadata index to find an original metadata embedding that is closest to the lookup vector; and associating the original metadata embedding with a free-value embedding, the free-value embedding being combined with the query embedding rather than the original metadata embedding, the free-value embedding being one of a plurality of free-value embeddings, the free-value embeddings being trained together with the third machine-trained model.

19. A computer-readable storage medium for storing computer-readable instructions, a processing system executing the computer-readable instructions to perform operations, the operations comprising:

receiving the input query;

encoding the input query into a query embedding;

mapping the input query into a lookup vector;

searching an index to find an original metadata embedding that is closest to the lookup vector; and associating the original metadata embedding with a free-value embedding, the free-value embedding being one of a plurality of free-value embeddings;

combining the query embedding with the free-value embedding using a machine-trained model, to produce an augmented embedding, the machine-trained model being trained together with the free-value embeddings;

identifying a target item based on the augmented embedding; and generating output information for presentation by an output device, the output information including the target item or a reference to the target item.

\* \* \* \* \*